May 3, 1927.
J. A. ROSE
1,627,409
METHOD AND APPARATUS FOR TRANSMITTING ELECTRIC CURRENT
Filed July 12, 1924
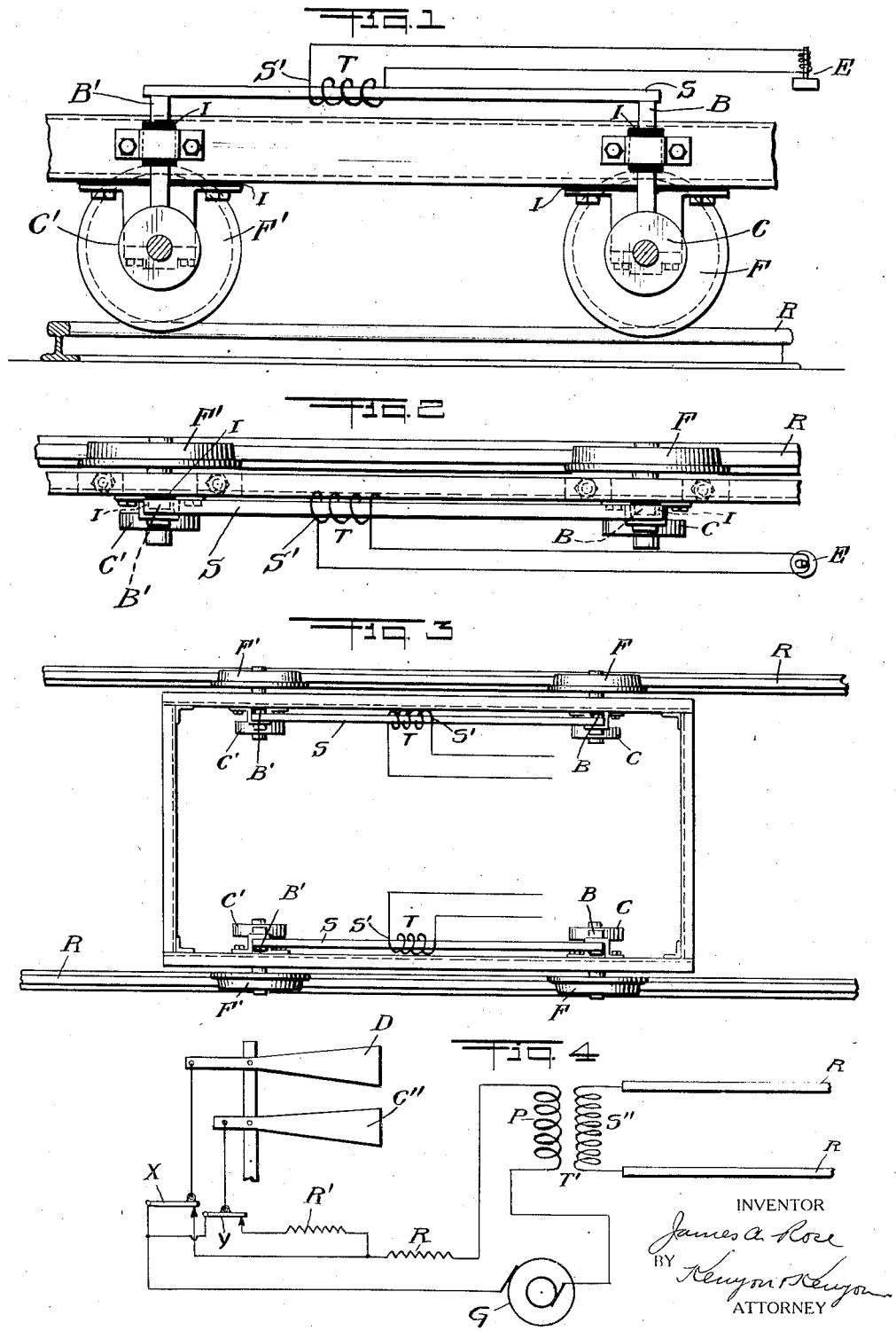

Patented May 3, 1927.

1,627,409

UNITED STATES PATENT OFFICE.

JAMES A. ROSE, OF LANCASTER, PENNSYLVANIA, ASSIGNOR TO LOWELL-WINTSCH AUTOMATIC TRAIN CONTROL, INC., OF LANCASTER, PENNSYLVANIA, A CORPORATION OF DELAWARE.

METHOD AND APPARATUS FOR TRANSMITTING ELECTRIC CURRENT.

Application filed July 12, 1924. Serial No. 725,663.

My invention relates to methods and apparatus for transmitting current and particularly to methods and apparatus for transmitting current to moving vehicles. A special application of my invention resides in transmitting current to vehicles, such as railroad cars and locomotives, where no return line for the current is available.

It has been proposed to transmit electric current to moving vehicles, where no return line is provided as in the case of electrically driven vehicles that have a third rail or overhead wire to supply current and a rail return, by inducing a current in a coil carried by the vehicle, but such a system is subject to limitations and defects that render it impracticable for important purposes.

It is an object of my invention to transmit electric current to moving vehicles, regardless of whether a return line is provided, in such a way that the defects and insufficiencies of former methods will be overcome, a further object being to transmit electric current to moving vehicles by means of a circuit that is continuous but does not require a separate return line.

In accordance with my invention current may be passed to a moving vehicle by a continuous circuit as distinguished from passing the current to the vehicle by mere induction between the apparatus on the vehicle and stationary cooperating apparatus; and in accordance with my invention current is passed to the moving vehicle through a continuous circuit without interference with or reliance upon any circuit that may transmit a power or driving current to the vehicle by means of supply and return lines. To this end current is passed through the rail and a shunt is carried by the vehicle that will divert some of the current passing through the rail to the vehicle. The current that is in the shunt may be utilized for any purpose whatever, for example, for transmitting a signal to the moving vehicle or for operating control devices thereon so that the vehicle may be controlled independently of or co-ordinately with the control effected by the crew of the vehicle.

For the purpose of assisting in the understanding of my invention I herein describe one application and embodiment of my invention, it being understood, however, that my invention is not limited to the particular embodiment described or any of the details thereof that are referred to.

Further object and advantages of my invention will appear from the following description of one embodiment and application thereof that are set forth for the purpose of assisting in the understanding thereof and will be pointed out in the hereunto appended claims.

In the drawings in which like reference characters indicate similar parts,

Fig. 1 is a diagrammatic view of apparatus embodying my invention and useful in the practice thereof, Fig. 2 is a plan view of the construction shown in Fig. 1, Fig. 3 is a modification of the construction shown in Fig. 2, and Fig. 4 is a wiring diagram embodying and useful in the practice of my invention.

Referring to Fig. 1 the rail R will be supplied with current as hereinafter described and any pair of wheels F and F' of the vehicle may be provided with collector rings C and C'. Brushes B and B' are arranged to engage the collector rings C and C', and connecting the brushes B and B' there is a shunt member S that is advantageously of as low an electric resistance as possible.

The wheels, collector rings, brushes and shunt member S provide a continuous circuit between the ground or a stationary element such as the rail R and the moving vehicle, and the proportion of current supplied to the rail R that will flow through the continuous circuit so provided will depend upon the relative resistances of the rail between the contacts with the rail, namely, the wheels F and F' and the resistance of the continuous circuit including the shunt member S. While the current flowing in the shunt member S may be directly employed for any purpose, such as regulating the control mechanism of the train or vehicle, it is preferable in order to preserve the low resistance of the continuous circuit and the shunt member S to derive current from the shunt member S by means of a transformer T that is preferably a step up transformer. The shunt member S includes and comprises the primary of the transformer T and the secondary S' is a separate coil. The current in the secondary S' of the transformer T may be employed to operate control devices of the vehicle such as the throttle or electric controller for brakes, or it may be used to transmit a signal to the moving vehicle. There will be current in the secondary S' of the transformer T as long as the rail is energized and variations of the current in the secondary S' of the transformer T may be effected by varying the current in the rail R for the purpose of transmitting a telegraphic or telephonic signal or for the purpose of operating a selector device or any control mechanism on the vehicle. In accordance with my invention it is possible to transmit current to a moving vehicle throughout any part of the time that the vehicle is moving.

It is preferable to pick up current through wheels that are not mounted upon the same axle and it is preferable to select wheels that are on the same side of the train and in contact with the rails at points sufficiently spaced to cause appreciable flow of current through the shunt carried by the vehicle. And in Fig. 3 an arrangement is shown whereby two shunts are provided on the vehicle by forming circuits extending between pairs of wheels on opposite sides of the vehicle.

In the interests of economy the rails of the track may be respectively connected to the secondary S'' of a transformer T' and no current will flow in the rails until the space between them is bridged by the wheels and axle of a vehicle. If it is desired to operate the control devices of a train in conjunction and co-ordination with the signal system the supply to the rails may be made dependent upon the setting or adjustment of the signals. Thus, for example, the primary circuit P of the transformer T' may be provided with a switch X that is closed by a danger signal D so that when the danger signal is horizontal the generator G will supply current to the primary P through any desired resistance or impedance R. And when the caution signal C'' is horizontal the switch Y will be closed and the generator G will supply a current of different intensity to the primary P through the resistances or impedances R and R'. It is to be understood that the arrangements of signals and switches whereby the flow of current in the primary P is initiated and varied is subject to any modification that may serve the requirement of any given signal system and that the arrangement shown is merely exemplary. In the arrangement shown in Fig. 4 it is intended that the current in the shunt member S will operate a control device of the vehicle such as the throttle or other power controller or brakes and if the danger signal is set there will be a strong current in the rails and a proportionately strong current in the shunt member S will operate the control devices to stop the vehicle. If the caution signal is set a weaker current will operate the control devices to either slow down or stop the vehicle as may be desired. For example, when the caution signal is set the current in the shunt member S may operate only the brakes, whereas the current produced when the danger signal is set may be used to operate both brakes and the throttle or other control device.

From the foregoing it will be apparent that I have described and illustrated a method and apparatus whereby electric current may be transmitted to a moving vehicle and whereby that current is transmitted through a continuous circuit and whereby any current may flow to the vehicle during any period of time desired, the current being utilized to transmit signals to the vehicle or to operate the control devices thereof, either independently or in conjunction and co-ordination with a signaling system. And it will be apparent that in accordance with my invention current may be transmitted to a moving vehicle regardless of whether or not the vehicle is provided with supply and return circuits for currents utilized for other purposes. Suitable insulation I protects the shunt. The current in the secondary S' of the transformer T may operate an electro-magnet E that in turn operates any control device on the vehicle or transmits a signal.

While I have described one application and embodiment of my invention in great detail I do not intend to be limited to the various details described but intend that my invention shall include modifications and variations that fall within the hereunto appended claims.

What I claim as new and desire to secure by Letters Patent is:

1. In combination with a pair of rails, a transformer having the terminals of one of its coils respectively connected to said rails, a vehicle having means for electrically connecting said rails, a control circuit carried by said vehicle and connected in shunt with the circuit formed by said rails, a source of current connected to the other coil of said transformer, a signal for the vehicle, and signal controlled means for varying the current in the circuit of one of said coils.

2. In combination with a pair of rails, a transformer having the terminals of one of its coils respectively connected to said rails, a vehicle having means for electrically connecting said rails, a control circuit carried by said vehicle and connected in shunt with the circuit formed by said rails, signals for the vehicle, and means dependent upon the setting of said signals for energizing the other coil of said transformer.

3. In combination with a pair of rails, a transformer having the terminals of one of its coils respectively connected to said rails, a vehicle having means for electrically connecting said rails, a control circuit carried by said vehicle and connected in shunt with the circuit formed by said rails, signals for the vehicle and adjustable to different settings, a circuit for energizing the other coil of said transformer, and means dependent upon the setting of said signals for controlling the degree of energization of said energizing circuit.

4. In combination with a pair of rails, a transformer having the terminals of one of its coils respectively connected to said rails, a vehicle having means for electrically connecting said rails, a control circuit carried by said vehicle and connected in shunt with the circuit formed by said rails, signals operable to regulate the movement of said vehicle along said rails, and means for energizing the other coil of said transformer in accordance with the operation of said signals.

5. In combination with a rail, a vehicle, a control circuit carried by said vehicle, means for connecting the terminals of said control circuit to spaced points on said rail, a signal for regulating movement of said vehicle along said rail, and means for energizing said rail in accordance with the operation of said signal.

In testimony whereof, I have signed my name to this specification.

JAMES A. ROSE.